(12) United States Patent
Moser et al.

(10) Patent No.: US 9,254,909 B2
(45) Date of Patent: Feb. 9, 2016

(54) OPTIMIZED FLAP POSITIONING FOR GO-AROUND OPERATIONS

(71) Applicant: The Boeing Company, Chicago, IL (US)

(72) Inventors: Matthew A. Moser, Marysville, WA (US); Michael R. Finn, Kirkland, WA (US); Benjamin M. Liu, Bothell, WA (US)

(73) Assignee: The Boeing Company, Chicago, IL (US)

(*) Notice: Subject to any disclaimer, the term of this patent is extended or adjusted under 35 U.S.C. 154(b) by 72 days.

(21) Appl. No.: 14/034,969

(22) Filed: Sep. 24, 2013

(65) Prior Publication Data

US 2015/0088340 A1    Mar. 26, 2015

(51) Int. Cl.
*B64C 3/00* (2006.01)
*B64C 13/16* (2006.01)
*B64C 9/16* (2006.01)
*B64C 9/22* (2006.01)

(52) U.S. Cl.
CPC . *B64C 13/16* (2013.01); *B64C 9/16* (2013.01); *B64C 9/22* (2013.01)

(58) Field of Classification Search
CPC ....... Y02T 50/32; Y02T 50/44; Y02T 50/145; Y02T 50/12; Y02T 50/672; Y02T 50/166; Y02T 50/64; Y02T 50/673; Y02T 50/164; Y02T 50/34; B64C 3/50; B64C 3/48; B64C 9/323; B64C 9/02; B64C 13/16; B64C 2009/143; B64C 7/00; B64C 9/32; B64C 13/503; B64C 1/26; B64C 2039/105

USPC ........ 701/1, 14, 36, 11, 16, 15; 244/214, 213, 244/215, 183, 226, 229

See application file for complete search history.

(56) References Cited

U.S. PATENT DOCUMENTS

| | | | |
|---|---|---|---|
| 3,822,047 A * | 7/1974 | Schuldt, Jr. | 244/181 |
| 4,725,026 A | 2/1988 | Krafka et al. | |
| 4,838,503 A | 6/1989 | Williams | |
| 5,056,741 A | 10/1991 | Bliesner | |
| 5,839,699 A | 11/1998 | Bliesner | |
| 5,875,998 A * | 3/1999 | Gleine et al. | 244/195 |
| 6,152,405 A | 11/2000 | Muller | |
| 6,913,228 B2 | 7/2005 | Lee | |
| 7,322,547 B2 * | 1/2008 | Konings | 244/214 |
| 7,494,094 B2 | 2/2009 | Good et al. | |
| 7,556,224 B2 | 7/2009 | Johnson | |
| 7,641,152 B2 | 1/2010 | Onu et al. | |

(Continued)

OTHER PUBLICATIONS

Airbus, "Getting to Grips with Aircraft Performance," Jan. 2002.
Delta Virtual Airlines, "Boeing 777-200ER Aircraft Operating Manual," Nov. 2005.

(Continued)

*Primary Examiner* — Truc M Do

(57) ABSTRACT

A system for optimizing a flap setting of an aircraft may include a flap optimizing computer configured to compute an optimum flap setting for one or more flaps of an aircraft. The system may further include a flap control system communicatively coupled to the flap optimizing computer. The flap control system may be operable to select any one of a plurality of flap settings including a designated flap setting. The flap control system may be configured to automatically command the one or more flaps from a first position to a second position corresponding to the optimum flap setting in response to the selection of one of the plurality of flap settings using the flap control system.

19 Claims, 8 Drawing Sheets

(56) References Cited

U.S. PATENT DOCUMENTS

| | | |
|---|---|---|
| 7,726,610 B2 | 6/2010 | Good et al. |
| 8,356,766 B2 | 1/2013 | Garthaffner |
| 8,424,810 B1 | 4/2013 | Shmilovich et al. |
| 8,954,208 B2 | 2/2015 | Yamasaki |
| 2004/0128038 A1* | 7/2004 | Richter .................. B64C 13/04 701/3 |
| 2005/0242243 A1* | 11/2005 | Seve ........................ B64C 9/32 244/213 |
| 2006/0049308 A1* | 3/2006 | Good ........................ B64C 3/50 244/76 A |
| 2007/0057115 A1* | 3/2007 | Newton .......................... 244/89 |
| 2007/0185628 A1* | 8/2007 | Delaplace et al. ................ 701/4 |
| 2008/0255713 A1* | 10/2008 | Onu et al. ........................ 701/3 |
| 2010/0198432 A1* | 8/2010 | Ishihara ............... G01C 23/005 701/9 |
| 2010/0200704 A1* | 8/2010 | Berens et al. ................ 244/76 A |
| 2010/0219298 A1* | 9/2010 | Sauvinet ....................... 244/183 |
| 2010/0222946 A1* | 9/2010 | Sauvinet ......................... 701/15 |
| 2011/0127385 A1 | 6/2011 | Morris |
| 2013/0138274 A1* | 5/2013 | Caldeira et al. ................. 701/16 |

OTHER PUBLICATIONS

The Boeing Company, "777 Flight Crew Operations Manual—Flight Controls," Dec. 15, 2003.
Boeing Flight Operations, "Landing Performance," 2009.
TheAirlinePilots, "B777 Normal Procedures," Apr. 12, 2013.
Aero Quarterly, "Overweight Landing," 2007.

* cited by examiner

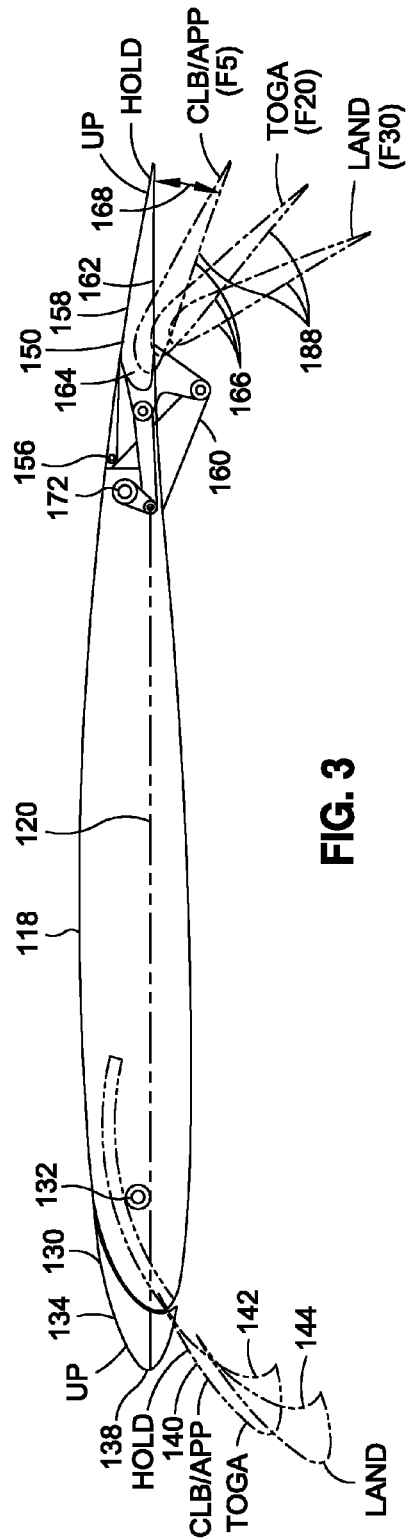

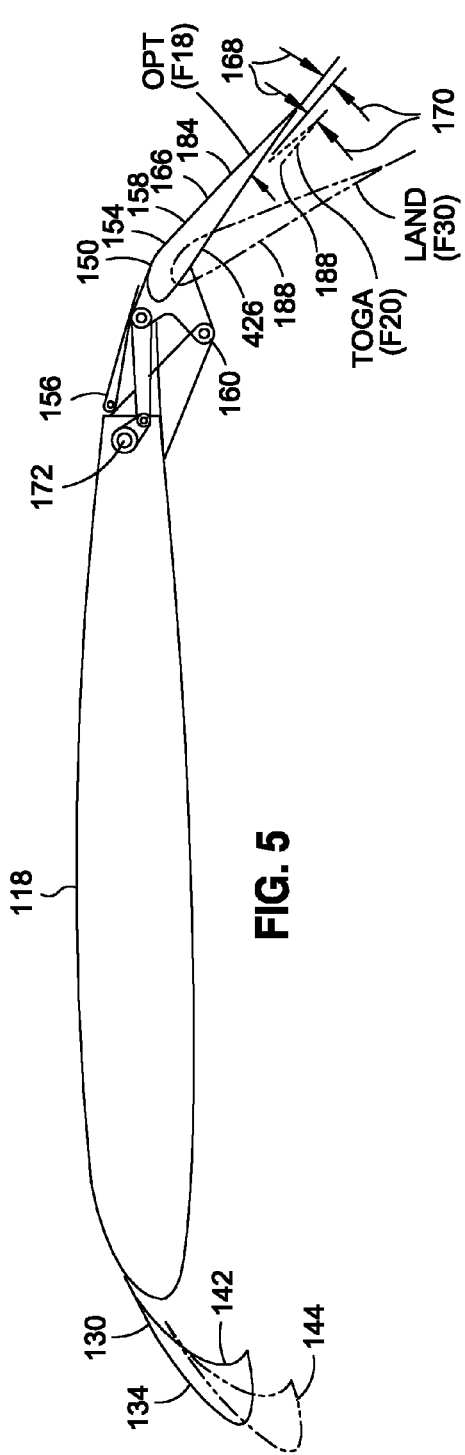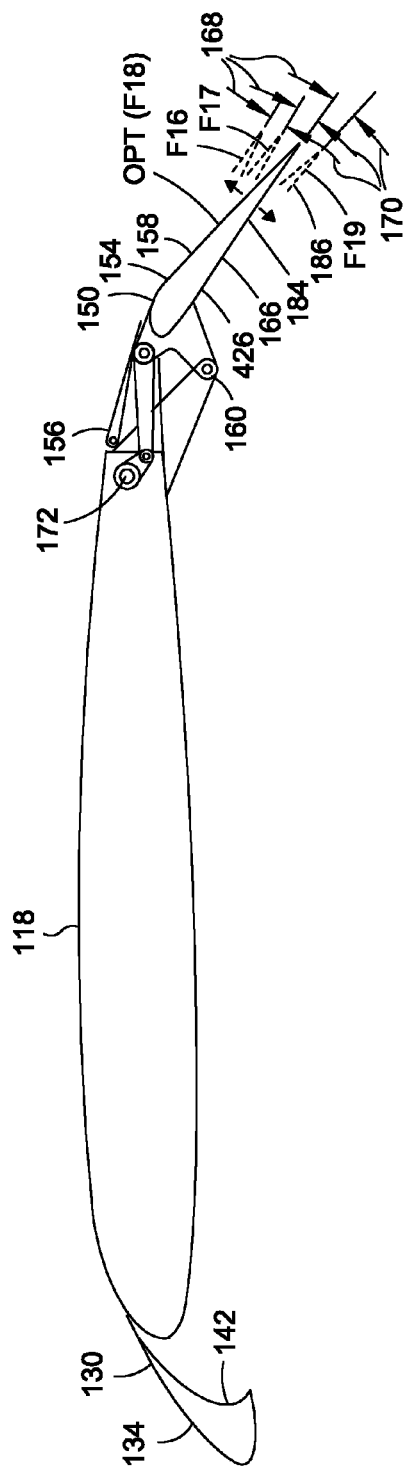

OPTIMIZED FLAP POSITIONING FOR GO-AROUND OPERATIONS

FIELD

The present disclosure relates generally to aircraft flight controls and, more particularly, to the positioning of trailing edge flaps such as during a go-around operation.

BACKGROUND

Aircraft, such as commercial airliners, typically include control surfaces or devices mounted on the wings to improve the aerodynamic performance of the aircraft. Such control surfaces typically include wing leading edge devices and wing trailing edge devices which may be extended and/or deflected during different phases of flight to alter the lift and/or drag characteristics of the wings. For example, commercial airliners typically include trailing edge flaps which may be extended during takeoff, approach, landing, and other flight phases to increase the area and camber of the wings to increase the wing lift characteristics.

Aircraft regulatory bodies such as the Federal Aviation Administration require that aircraft meet minimum performance standards for different phases of flight. For example, Federal Aviation Regulation (FAR) 25.121 specifies a minimum climb gradient capability for an aircraft during a critical engine inoperative situation. For a twin-engine aircraft, FAR 25.121(d) specifies a minimum approach-climb gradient capability of 2.1% with one engine inoperative, the landing gear retracted, the aircraft in an approach flaps configuration, and the remaining engine at a go-around thrust setting. In addition, FAR 25.121(d) specifies that the stall speed in the approach configuration must not exceed 110 percent of the stall speed ("the 110% speed rule") for the related all-engines-operating landing configuration.

FAR 25.119 specifies a minimum landing-climb gradient capability of 3.2% with all engines operating, the aircraft in a landing flaps configuration, and the engines generating as much thrust as is possible eight seconds after advancing the throttles to the go-around thrust setting. FAR 25.1001(a) requires that a fuel jettisoning system must be installed unless it is shown that the airplane meets the climb requirements of FAR 25.119 and 25.121(d) at maximum takeoff weight, less the actual or computed weight of fuel necessary for a 15-minute flight comprising a takeoff, go-around, and landing at the airport of departure. FAR 25.1001(b) requires that if a fuel jettisoning system is required, it must be capable of jettisoning enough fuel within 15 minutes, starting with the weight given in FAR 25.1001(a), to enable the airplane to meet the climb requirements of FAR 25.119 and 25.121(d). The aircraft must be capable of meeting the more restrictive of the approach-climb requirement and the landing-climb requirement.

Conventional aircraft typically allow for extending the flaps to a limited number of flap settings. For example, certain aircraft may have flap detent settings of Flaps 1, Flaps 5, Flaps 15, Flaps 20, Flaps 25, or Flaps 30. During final approach to an airport, Flaps 25 or 30 may be selected for landing the aircraft. The flap setting will be reduced to Flaps 20 if the landing is aborted and a go-around operation is initiated. However, if the aircraft takes off with the maximum takeoff weight, the aircraft may not be able to meet the approach-climb and landing-climb requirements at the departure airport using Flaps 20 as the go-around flap setting. To compensate, the aircraft may be required to take off with a reduced gross weight by reducing the payload of the aircraft. In this regard, conventional flap control systems and/or aircraft with such conventional flap control systems may be limited in their performance and/or operational capability.

SUMMARY

Examples of methods and system for optimizing a flap setting of an aircraft are described. A flap optimizing system according to the present disclosure may include a flap optimizing computer and a flap control system. The flap control system may be communicatively coupled to the flap optimizing computer and may be operable to select any one of a plurality of flap settings including a designated flap setting, and may be configured to automatically command the one or more flaps from a first position to a second position corresponding to the optimum flap setting responsive to selection of the designated flap setting. In some embodiments, the flap control system may include a flap control device having a plurality of control device positions each representing a flap setting, and including at least one designated control device position (e.g., a designated flap setting). In some embodiments, the flap optimizing system may include a flap actuation system, which may be communicatively coupled to the flap control system and may be configured to actuate the one or more flaps. The flap optimizing computer may be configured to compute the optimum flap setting based, at least in part, on aircraft state data, airport information, or combinations thereof.

Also disclosed is an aircraft having a wing and at least one flap mounted to the wing. The aircraft may include a flap optimizing system for optimizing a flap setting of the flap. The flap optimizing system may include a flap optimizing computer, a flap control system, and a flap actuation system. The flap control system may be communicatively coupled to the flap optimizing computer and may include a flap control device having a plurality of control device positions each representing a flap setting, and including at least one designated control device position (e.g., a designated flap setting). The flap actuation system may be communicatively coupled to the flap control system and may be configured to position one or more flaps. The flap control system may automatically command the flap actuation system to position the flaps at the optimum flap setting when the flap control device is moved into the designated control device position.

Also disclosed is a method of optimizing a flap setting for an aircraft. The method may include receiving, at a flap optimizing computer, aircraft state data and/or airport information. The method may include computing an optimum flap setting based, at least in part, on the aircraft state data and/or the airport information. The method may further include moving a flap control device from a non-designated control device position to a designated control device position. For example, the method may include manually moving the flap control device, which may be a flap control lever provided in a flight deck of the aircraft, from a non-designated control device position to a designated control device position. The method may further include automatically commanding the flaps to move to a position corresponding to the optimum flap setting in response to moving the flap control device from the non-designated control device position to the designated control device position.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 3 is a section view of a wing taken along line 3 of FIG. 1 and illustrating a leading edge slat and a trailing edge flap being positionable in a number of standard flap settings;

FIG. 4 is a section view of the wing of FIG. 3 in a landing configuration and illustrating a leading edge slat extended into a gapped position, and the trailing edge flap extended into a landing flaps position;

FIG. 5 is a section view of the wing of FIG. 4 in a go-around configuration and illustrating the leading edge slat retracted in a sealed position, and the trailing edge flap retracted from a landing flap setting to an optimum flap setting;

FIG. 6 is a section view of the wing of FIG. 5 in the go-around configuration and illustrating movement of the trailing edge flap from a position corresponding to the optimum flap setting to an adjusted position corresponding to an adjusted flap setting;

DETAILED DESCRIPTION

Figure 1:
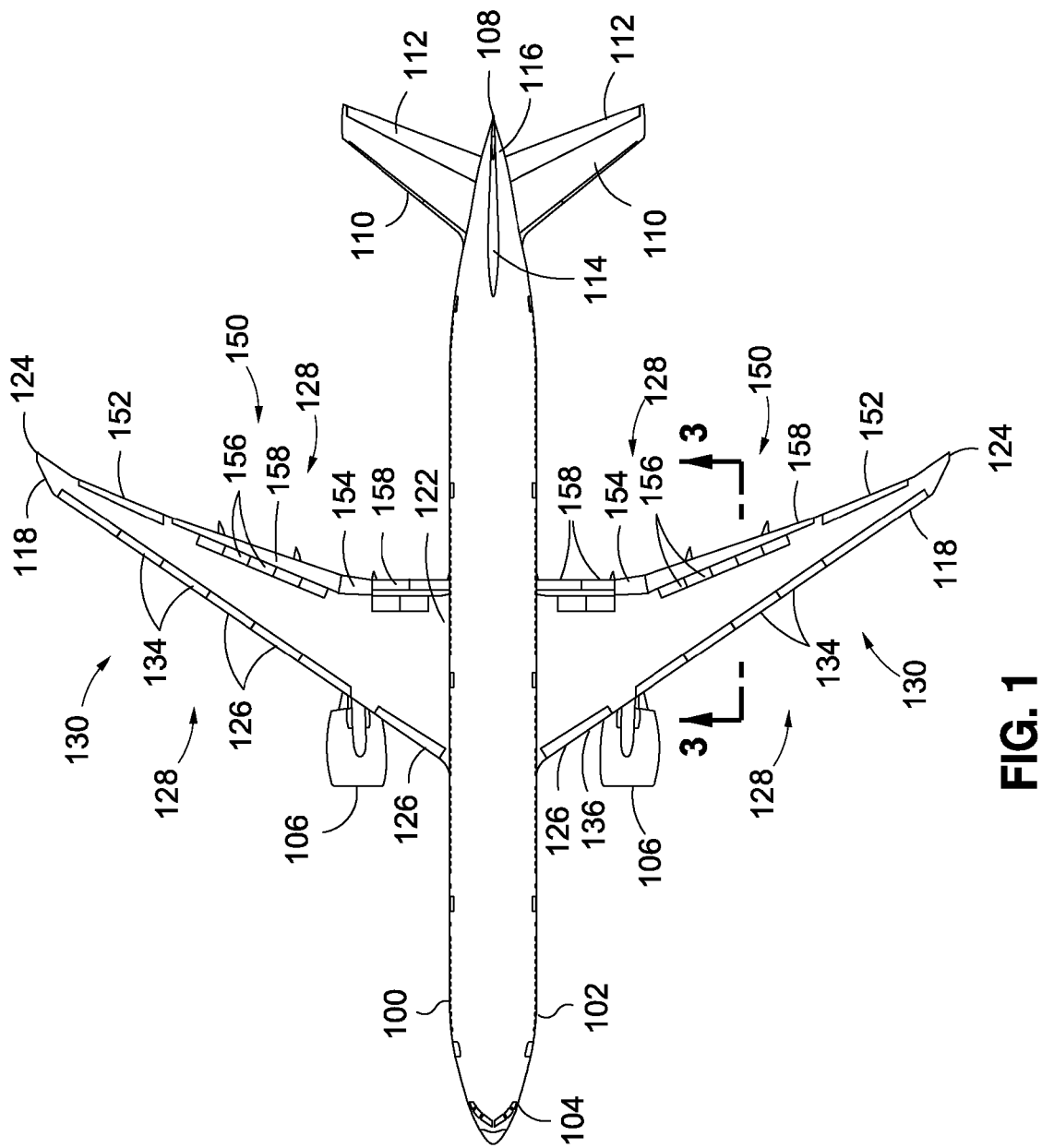
FIG. 1 is a top view of an aircraft.

Referring now to the drawings wherein the showings are for purposes of illustrating various embodiments of the present disclosure, shown in FIG. 1 is a top view of an aircraft 100 having a fuselage 102 and a pair of wings 118. Each wing 118 may extend outwardly from a wing root 122 to a wing tip 124. The aircraft 100 may include one or more propulsion units 106 which may be mounted on the wings 118 and/or on the fuselage 102. The aircraft 100 may include an empennage 108 having a horizontal tail 110 and elevator 112, and a vertical tail 114 and rudder 116. The aircraft 100 may include one or more high-lift devices, for example one or more leading edge devices 130 and/or one or more trailing edge devices 150, which may be mounted on the wings 118. Any of the leading edge devices 130, trailing edge devices 150, or combinations thereof may be extended to alter the lift and drag characteristics of the wings 118.

Figure 2:
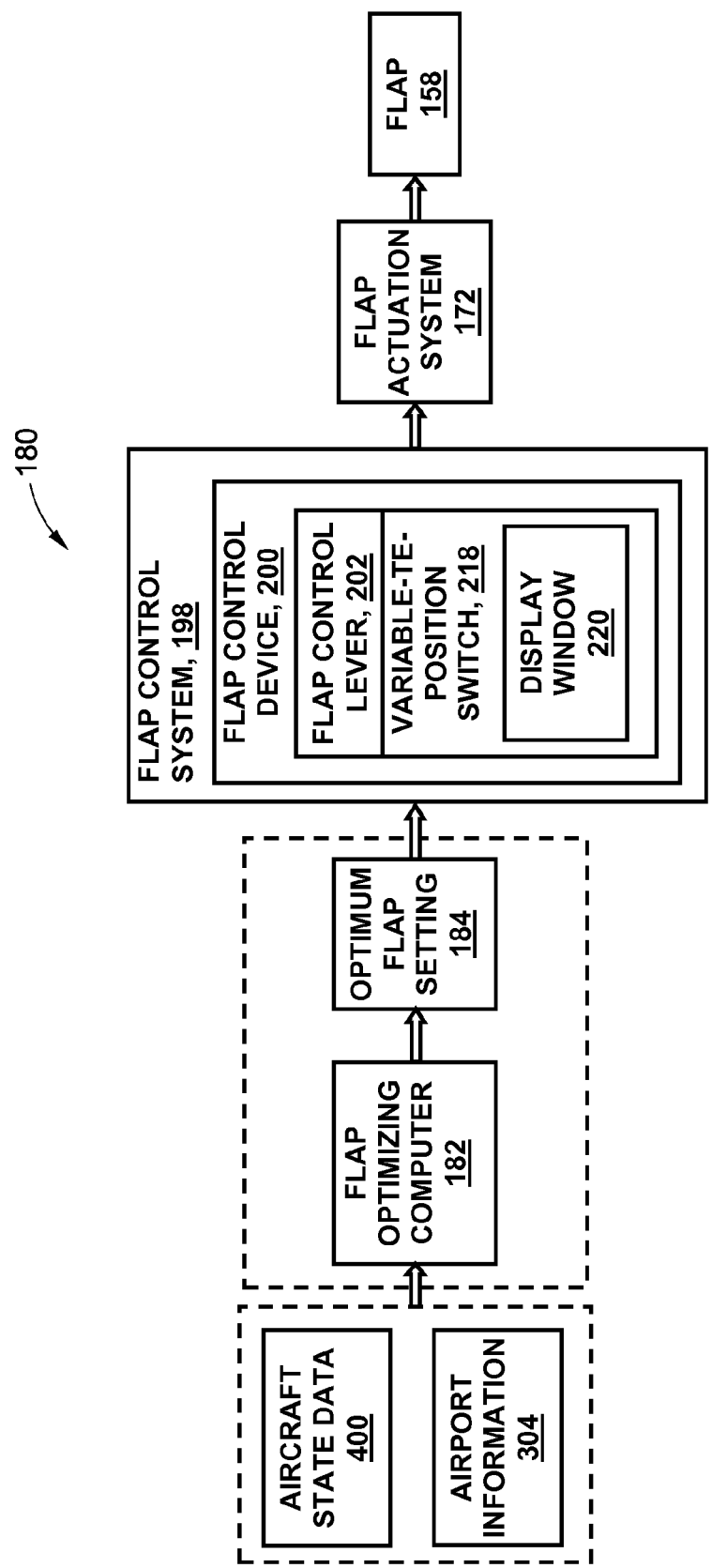
FIG. 2 is a block diagram of a flap optimizing system.

The aircraft 100 may include a system for optimizing a flap setting and/or a corresponding deflection angle of the one or more high-lift devices, which system is interchangeably referred to herein as flap optimizing system 180. A block diagram of a flap optimizing system 180 is shown in FIG. 2. The flap optimizing system 180 may be configured to determine an optimum flap setting 184 of the flaps 128 and automatically command the one or more flaps 128 to a position corresponding to the optimum flap setting 184, for example in response to an occurrence of a certain condition. Flap 128 in the context of the present disclosure refers to any high-lift device, including any leading edge devices 130 such as slats 134, Kreuger flaps 136, leading edge root extensions or other leading edge devices, as well as any trailing edge devices 150 such as hinged flaps 158, fowler flaps, blown flaps and other trailing edge devices. As depicted in FIG. 2, the flap optimizing system 180 may include a flap optimizing computer 182 and a flap control system 198 communicatively coupled to the flap optimizing computer 182. The flap optimizing system 180 may be configured to compute an optimum flap setting 184 based, at least in part, on aircraft state data 400, airport information 304, or combinations thereof. As will be further described, the system 180 may be configured to re-compute the optimum flap setting 184 continuously or periodically (e.g., responsive to a change in the aircraft state data 400 or airport information 304).

In some embodiments, the flap optimizing system 180 may include a flap actuation system 172 communicatively coupled to the flap control system 172 and configured to actuate the flaps 128 of the aircraft 100 to an optimum flap setting 184 computed by flap optimizing computer 182. The flap control system 198 may include a flap control device 200, which may be controllably electronically (e.g., via a touch screen) or mechanically via a flap control lever 202. The flap control device may further include a switch 218, which may be operable to enable manual control of the flaps (e.g., by the flight crew) while automatic control mode of the flaps 128 is engaged. In some embodiments, the flap control device 200 may include a display window 220 for displaying information to the flight crew.

As described in greater detail below, a flap optimizing system 180 according to the present disclosure may be implemented for optimizing the positioning of high-lift devices, for example by moving any of the leading edge and/or trailing edge devices 130, 150 in small flap deflection increments 170 (see e.g., FIG. 6), which may be different from and/or smaller than flap detent changes typically associated with standard flap settings 188 (FIG. 3). In this manner, the flap optimizing system 180 may be operable to improve the lift-to-drag ratio (L/D), for example to mitigate losses in climb performance while meeting approach-climb and landing-climb gradient requirements. Although described in the context of a tube-and-wing aircraft as shown in FIG. 1, the flap optimizing system 180 as disclosed herein may be incorporated into any aircraft configuration, without limitation, including blended wing aircraft or hybrid wing-body aircraft configurations, and other aircraft configurations.

FIG. 3 shows a cross-section of a wing 118 having a leading edge device 130 and a trailing edge device 150, each of which may be extended from a retracted position 138, 164 to an extended position 140, 166, for example to increase the camber of the wing 118 and change the lift characteristics of the wing 118. As depicted in FIG. 2, the leading edge device 130 may be implemented as a slat 134 which is shown in a retracted position 138 and which may be downwardly and/or forwardly extendable from the leading edge of the wing 118. In some examples, the leading edge device 130 may be implemented as any of a variety of different leading edge devices 130. For example, the leading edge device 130 may be a Krueger flap 136, or other leading edge device 130 currently known or later developed. The leading edge device 130 may be actuated by a leading edge device actuation system 132. For example, the leading edge device actuation system 132 may include a torque tube (not shown) which may be driven by one or more power drive units (PDUs—not shown). Any number of torque tubes, power drive units, and/or other motors or actuators (not shown) may be used for actuation of the leading edge devices 130 depending on the aircraft without departing from the scope of the present disclosure.

The trailing edge device 150 may be implemented as a simple flap 158 supported on a drop hinge 160, as shown in FIG. 3. The trailing edge device 150 may be implemented as any of a variety of trailing edge devices 150, and is not limited to the simple flap shown. For example, the trailing edge device 150 may be implemented as a plain flap, a single-slotted flap, a multi-slotted flap, or any one of a variety of other flap configurations currently known or later developed. As depicted in FIG. 1, the aircraft may include any number of trailing edge devices 150 such as ailerons 152, flaperons 154), and/or spoilers 156. The spoilers 156 may, at least partially, overlap the flaps 158 and may droop downwardly during flap 158 deflection to promote the flow of air over the upper surface of the wing 118 and flaps 158. The one or more leading edge devices 130, the trailing edge devices 150, or combinations thereof, may be controllable by the flap optimizing system 180.

In some examples, the flaps 158 may be actuated by a flap actuation system 172. In an embodiment, the flap actuation system 172 may include a trailing edge linkage assembly (not shown) coupled to a torque tube which, in turn, may be rotatably driven by a power drive unit (PDU) and/or an independent actuator similar to the above-described leading edge device actuation system 132. As described in greater detail below, during certain phases of flight such as during a go-around operation, the leading edge devices 130 may be actuated instead of or in conjunction with the actuation of the trailing edge devices 150 to the optimum flap setting 184, e.g., to improve the climb performance of the aircraft 100.

The flaps 128 (e.g., hinged flap 158) may be deployed to one or more standard flap settings 188. In an embodiment, the standard flap settings 188 may include UP, HOLD, CLB/APP, TOGA, and LAND. Other standard flap settings and/or designations of the same may be implemented and the particular example is not to be viewed as limiting. The UP flap setting may correspond to a retracted position 138 for the slats 134 and a retracted position 164 for the flaps 158. The UP flap setting may be selected when the aircraft 100 is in cruise mode. The HOLD flap setting may correspond to an extended position 140 for the slats 134 and a retracted position 164 for the flaps 158. The HOLD flap setting may be selected when the aircraft 100 is in a holding pattern. The CLB/APP flap setting may correspond to an extended position 140 for the slats 134, and an extended position 166 for the flaps 158. The CLB/APP flap setting may be selected when the aircraft 100 is in a climbing mode or when the aircraft 100 is in an approach configuration 420 (e.g., as shown in FIG. 2). The CLB/APP flap setting may correspond to a flap setting of between Flaps 5 to Flaps 15 or more, depending upon the aircraft. The LAND flap setting may correspond to an extended position 140 for the slats 134, and an extended position 166 for the flaps 158. The LAND flap setting may be selected during final approach, e.g., to place the aircraft 100 in a landing configuration 422. The LAND flap setting may correspond to a relatively deep flap setting of Flaps 30 or more, depending upon the aircraft 100.

The TOGA flap setting may correspond to an extended position 140 for the slats 134, and an extended position 166 for the flaps 158. The TOGA flap setting may be selected during takeoff. Depending upon the aircraft, the standard TOGA flap setting may correspond to a standard flap setting 188 of Flaps 20, although the standard TOGA flap setting may correspond to a flap setting of anywhere between Flaps 5 to Flaps 20 or more. Upon initiation of a go-around operation, for example by switching to the TOGA flap setting from a LAND flap setting, the flap optimizing system 180 may be configured to place the aircraft 100 in a go-around configuration 426 (see e.g., FIG. 2). In this regard, selection of the TOGA flap setting may initiate automatic command of the flaps to an optimum flap setting 184 determined by the flap optimizing computer 182.

In FIG. 3, for the simple drop hinge 160 flap 158 embodiment, flap deflection angles (e.g., flap angle 168) may be defined in terms of the local wing chord line 120 and the local flap chord line 162. In this regard, when the flap 158 is in the retracted position 164, the local flap chord line 162 may be generally aligned with the local wing chord line 120. The local wing chord line 120 may pass through the trailing edge of the flap 158. The actual flap angle 168 may be defined as the angle between the local wing chord line 120 and the local flap chord line 162. However, for multi-slotted flaps or other non-simple flap configurations, the actual flap angle may be measured in a different manner. In addition, it should be noted that the above-mentioned flap settings such as Flaps 5, Flaps 20, and Flaps 30 may not correspond to actual flap angles. For example, a flap setting of Flaps 5 may correspond to an actual flap angle of 12 degrees, or some other flap angle, and may not correspond to an actual flap angle of 5 degrees. A flap setting of Flaps 20 may correspond to an actual flap angle of 27 degrees, or some other flap angle, and may not correspond to an actual flap angle of 20 degrees.

Figure 7:
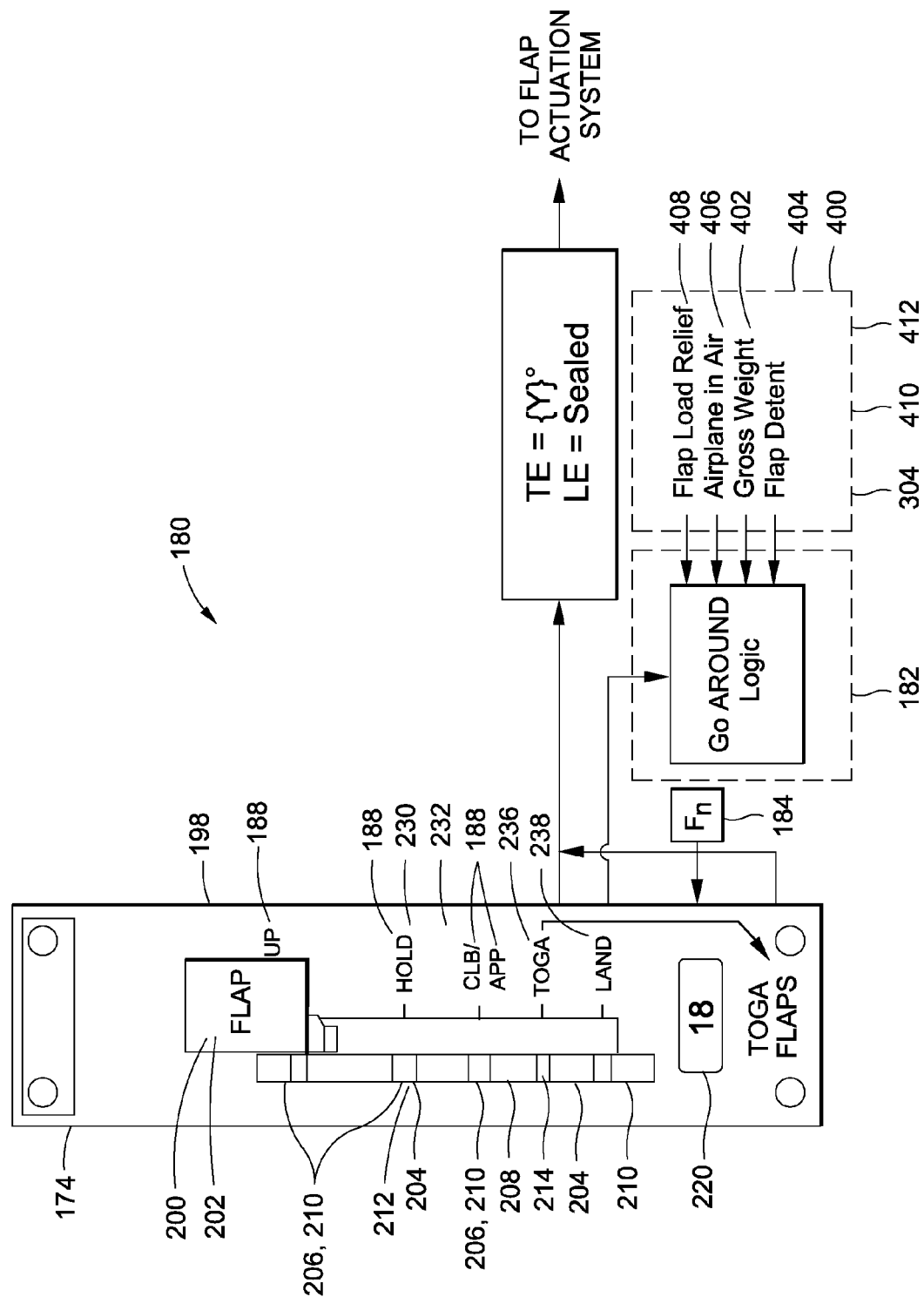
FIG. 7 is a diagrammatic view of the flap optimizing system including a flap control system coupled to a flap optimizing computer for determining an optimum flap setting.

FIG. 4 shows a cross-section of the wing 118 of the aircraft 100 of FIG. 2 in an example landing configuration 422. Other landing configurations may be used. In this example, the leading edge slat 134 is extended into a gapped position 144 providing a slot or gap 146 between the aft edge of the slat 134 and the forward edge of the main wing structure. The gap 146 may increase aerodynamic drag which may aid in reducing the airspeed of the aircraft 100 (e.g., airspeed 412 as shown in FIG. 7) and which may improve the landing performance of the aircraft 100. In the example in FIG. 4, the trailing edge flap 158 is extended from the retracted position 164 (e.g., UP flap setting shown in dashed) to the LAND flap setting to generate increased aerodynamic drag. The leading edge slat 134 and the trailing edge flap 158 may be commanded into the LAND flap setting in response to control inputs from the system 180 or responsive to control inputs from the flight crew. For example, the leading edge slat 134 and/or the trailing edge flap 158 may be commanded into the LAND flap setting in response to the pilot moving the flap control lever 202 into the landing flaps position 238 identified as LAND.

In FIG. 5, shown is a cross-section of the wing 118 of the aircraft 100 of FIG. 2 after the initiation of a go-around operation. The leading edge slats 134 and trailing-edge flaps 158 are retracted from a landing configuration (e.g., LAND flap setting shown in dashed line) and the aircraft 100 is provided in a go-around configuration 426. The leading edge slat 134 may be retracted from the gapped position 144 shown in FIG. 4, to a sealed position 142 shown in FIG. 5 to reduce aerodynamic drag and improve the climb performance of the aircraft 100. The trailing edge devices 150 (e.g., flaps 158) may be automatically commanded to move to the optimum flap setting 184 (e.g., OPT in FIG. 5) in response to the pilot or other flight crew moving the flap control lever 202 (FIG. 7) from the landing flaps position 238 (FIG. 7) identified as LAND (FIG. 7) to the go-around flaps position 236 (FIG. 7) identified as TOGA (FIG. 7). In an embodiment, the leading edge devices 130 (e.g. slats 134, Krueger flaps 136) may be communicatively coupled to the flap control system 198, and may be automatically moved from the gapped position 144 (FIG. 4) to the sealed position 142 (FIG. 5) when the flap control lever 202 (FIG. 7) is moved from the landing flaps position 238 (LAND—FIG. 7) to the go-around flaps position 236 (TOGA—FIG. 7).

As indicated above, the flap optimizing system 180 (FIG. 7) may include the flap optimizing computer 182 (FIG. 7) for determining the optimum flap setting 184 (FIG. 5) based on aircraft state data 400 (FIG. 7) and airport information 304 (FIG. 7) such as meteorological or atmospheric data 320. The flap optimizing computer 182 may determine the optimum flap setting 184 in relatively small flap deflection increments 170 (e.g., an actual flap angle of approximately one degree—FIG. 6) instead of the large flap detent changes (e.g., Flaps 30 to Flaps 20) associated with standard flap settings 188 (FIG. 3). The optimum flap setting 184 may be different than the standard flap setting 188 associated with a standard takeoff or go-around flap detent. For example, the optimum flap setting 184 (e.g., OPT in FIG. 5) may correspond to a Flaps 18 flap setting instead of a standard flap setting of Flaps 20. The optimum flap setting 184 may advantageously optimize the climb performance of the aircraft 100 (FIG. 2) such as by allowing for a shallower flap setting (e.g., Flaps 18) than a conventional flap setting (Flaps 20). As described in greater detail below, the optimum flap setting 184 may allow the aircraft 100 to meet the approach-climb and landing-climb gradient requirements as set forth under FAR 25.119 and FAR 25.121(d) (or non-U.S. equivalent) using a shallower flap setting to minimize aerodynamic drag. In this regard, the optimum flap setting 184 may be computed to the upper end of the range of the 1-g reference stall speed of the aircraft under FAR 25.121(d) which specifies that the 1-g stall speed of the aircraft in the approach configuration 420 may not be more that 1.1 times the 1-g stall speed of the aircraft in the landing configuration 422 (i.e., the 110% speed rule), as described in greater detail below.

In FIG. 6, shown is a cross-section of the wing 118 of the aircraft 100 of FIG. 2 in the go-around configuration 426. The flap 158 may be adjusted from the optimum flap setting 184 (FIG. 5—e.g., OPT—Flaps 18) into an adjusted flap setting 186 (FIG. 6—e.g., Flaps 19, Flaps 17, Flaps 16, etc.) as may be selected by the pilot. As described below, the flap control system 198 may include a switch 218 (FIG. 8) configured to allow the flight crew to manually adjust the flaps 158 from the optimum flap setting 184 to an adjusted flap setting 186 which may be different than the optimum flap setting 184. In an embodiment, the switch 218 may be configured to allow for manually changing the optimum flap setting 184 such that the flaps 158 may be adjusted in flap deflection increments 170 (FIG. 6) of no greater than approximately one degree of actual flap angle. However, the variable-trailing-edge-position switch 218 may be configured to adjust the flap setting such that the flaps 158 move in flap deflection increments 170 of greater than one degree of actual flap angle 168.

FIG. 7 shows a flap optimizing system 180 according to examples of the present disclosure. The flap optimizing system 180 may include a flap control system 198 coupled to a flap optimizing computer 182 configured to determine an optimum flap setting 184. The flap control system 198 may include a flap control device 200 that may be mounted on a console or a control stand 174 on the flight deck 104 of the aircraft 100 (see FIG. 1). The flap control device 200 may be operable for selecting one of a plurality of flap settings. For example, the flap control device 200 may be implemented as a mechanical lever (e.g., flap control lever 202) which may be movable between a plurality of control device positions 206.

In the embodiment shown, the control device positions 206 are identified by the flap settings UP, HOLD, CLB/APP, TOGA, and LAND corresponding to different aircraft flap configurations described above. However, other control device positions 206 may be included and/or the control device positions 206 may be identified by any one of a variety of different labeling systems.

In an embodiment, the control device positions 206 may be identified by one or more alphanumeric characters such as single digit whole numbers and/or by alpha characters. For example, the control device positions 206 may be identified by the flap settings UP, F1, F5, F15/OPT, and F30, which may or may not correspond to the actual flap angles 168 as mentioned above. In a further embodiment, the control device positions 206 may be identified by single digit whole numbers, such as 0, 1, 2, 3/OPT, FULL. In such alternative embodiments, the 15/OPT flap setting and the 3/OPT flap setting may correspond to the TOGA flap setting such that movement of the flap control device 200 from F30 to the F15/OPT flap setting, or from the FULL to the 3/OPT flap setting, may trigger automatic command of the flap 158 to the optimum flap setting 184 by the flap optimizing system 180.

With further reference to FIGS. 3-7, one or more of the control device positions 206 may correspond to a standard flap setting 188 or a flap setting range for a given aircraft configuration. For example, the hold flaps position 230 (e.g., HOLD) may correspond to a hold configuration of the aircraft, the climb or approach flaps position 232 (e.g., CLB/APP) may correspond to a climb configuration or an approach configuration 420 of the aircraft, the takeoff/go-around flaps position 236 (e.g., TOGA) may correspond to a takeoff configuration of the aircraft, and may also correspond to the go-around configuration which results in the automatic commanding of the flaps 158 to the optimum flap setting 184. The landing flaps position 238 (e.g., LAND) may correspond to a landing configuration 422 of the aircraft.

As noted above, and as shown in the example in FIG. 7, the flap control device 200 may be implemented as a flap control lever 202 that may be movable between a plurality of flap lever positions 212 including the landing flaps position 238 and the go-around flaps position 236. However, the flap control device 200 may be implemented in any configuration for manipulating the flaps 158, for example an electronic implementation (e.g., a touch screen) and is not limited to a flap control lever 202. The flap control device 200 may optionally include one or more mechanical gates 204 configured to prevent movement of the flap control device 200 or flap control lever 202 until the flap control lever 202 is manipulated (e.g., lifted, depressed, moved laterally, etc.) to move the flap control lever 202 past the mechanical gate. In this manner, the gates 204 may prevent inadvertent retraction of the flaps 158.

The flap optimizing system 180 may be a processor-based system having a processor-based flap optimizing computer 182 configured to compute the optimum flap setting 184 such as for a go-around operation 428 (FIG. 2) of an aircraft 100. The flap optimizing computer 182 may include computer executable instructions, which may be referred to herein as go-around logic which, when executed, cause the flap optimizing computer 182 to compute the optimum flap setting 184. The flap optimizing computer 182 may be integrated into a flight control computer (not shown). For example, computer executable instructions for computing an optimum flap setting 184 according to the examples herein may be included in a flight control computer or other avionics on the flight deck 104. As indicated above, the flap optimizing computer 182 may be configured to compute the optimum flap setting 184 whenever the flap control device 200 is moved into a designated control device position 208, which may in some examples be the landing flaps position 238. The flap optimizing computer 182 may be configured to determine the optimum flap setting 184 based, at least in part, on aircraft state data 400 and/or airport information 304.

In FIG. 7, the flap optimizing system 180 may further include the above-mentioned flap control system 198 which may be communicatively coupled to the flap optimizing computer 182. The flap actuation system 172 may be communicatively coupled to the flap control system 198 and may be configured to position the flaps 158 when the flap control device 200 is moved from a non-designated control device position 210 such as a landing flaps position 238 (e.g., LAND), to a designated control device position 208 such as a go-around flaps position 236 (e.g., TOGA). The flap control system 198 may automatically (e.g., without manual input) command the flap actuation system 172 to position the flaps 158 at the optimum flap setting 184 when the flap control device 200 is moved into the designated control device position 208 such as the go-around flaps position 236.

In FIG. 7, the flap optimizing computer 182 may compute the optimum flap setting 184 based on aircraft state data 400 and/or airport information 304. The aircraft state data 400 may include data representative of the state of the aircraft 100 at any given moment. For example, the aircraft state data 400 may include aircraft gross weight 402, aircraft center of gravity 404, flap detent setting, aircraft-in-air indication 406, and flaps load relief capability 408. In addition, the aircraft state data 400 may include the deflection angle increment that may be available using the flap control system 198, the maximum go-around thrust 410 capability of the aircraft 100 which may depend on whether all engines are operative, and other aircraft state data 400. The flap detent setting may indicate the current flap setting (e.g., LAND) to the flap optimizing computer 182. The aircraft-in-air indication 406 may indicate whether the aircraft 100 is in the air or on the ground. In this regard, the aircraft 100 may include one or more sensors (not shown) on the landing gear 126 (FIG. 1) to sense deflections in the landing gear 126 as an indication of whether the landing gear 126 is supporting any of the weight of the aircraft 100. The flaps load relief information may indicate to the flap optimizing computer 182 whether the flaps load relief capability 408 is activated. Flaps load relief may allow for temporarily and automatically retracting the flaps 158 when the aircraft airspeed 412 exceeds the flap placard speed, and allowing the flaps 158 to be automatically extended back into the optimum flap setting 184 or an adjusted flap setting 186, after the aircraft airspeed 412 falls below the flap placard speed.

In FIG. 7, the airport information 304 may include atmospheric data 320 such as outside air temperature 322, pressure altitude 326, density altitude 324, and other information that may be representative of the meteorological conditions at the airport 300 and/or within the area of the go-around operation. The airport information 304 may also include environmental information such as the location, height, and type of any obstacles or terrain in the area of the go-around and which may have an affect on the determination of the optimum flap setting 184. In an embodiment, the flight control computer may continuously receive updates regarding the aircraft state data 400 and airport information 304. For example, the aircraft state data 400 and/or the airport information 304 may be continuously provided to the flap optimizing computer 182 in real-time when the flap 158 lever is in the landing flaps position 238. In addition, the aircraft state data 400 and/or the airport information 304 may be continuously provided to the flap optimizing computer 182 when the flap control device 200 is in the go-around flaps position 236 (e.g., TOGA) after initiation of the go-around operation 428. In an embodiment, the flap optimizing computer 182 may be configured to update a value of the optimum flap setting 184 based on information, which may be continuously or periodically updated while the flap control lever 202 remains in the designated control device position 208. Automatic command of the flaps 158 may be discontinued in response to movement of the lever 202 from the designated flap lever position 214 (e.g., out of the go-around flaps position 236) to a non-designated position 210.

In FIG. 7, the flap control system 198 may include a display window 220 for displaying the value of the optimum flap setting 184 (e.g. Flaps 18), for example to provide a visual indication to the pilot and flight crew. The display window 220 may be located virtually anywhere in the flight deck, for example below the flap control lever 202 on the control stand 174, or in any other location that is visible by the flight crew. The display window 220 may show the adjusted flap setting 186 following the manual adjustment of the optimum flap setting 184 by the pilot as described in greater detail below. The optimum flap setting 184 may change with real-time changes in the aircraft state data 400 and/or real-time changes in the airport information 304 as the aircraft 100 approaches the airport 300. The optimum flap setting 184 may be displayed whenever the flap control device 200 is in the landing flaps position 238. In addition, the optimum flap setting 184 may be displayed when the flap control device 200 is in the go-around flaps position 236.

Figure 8:
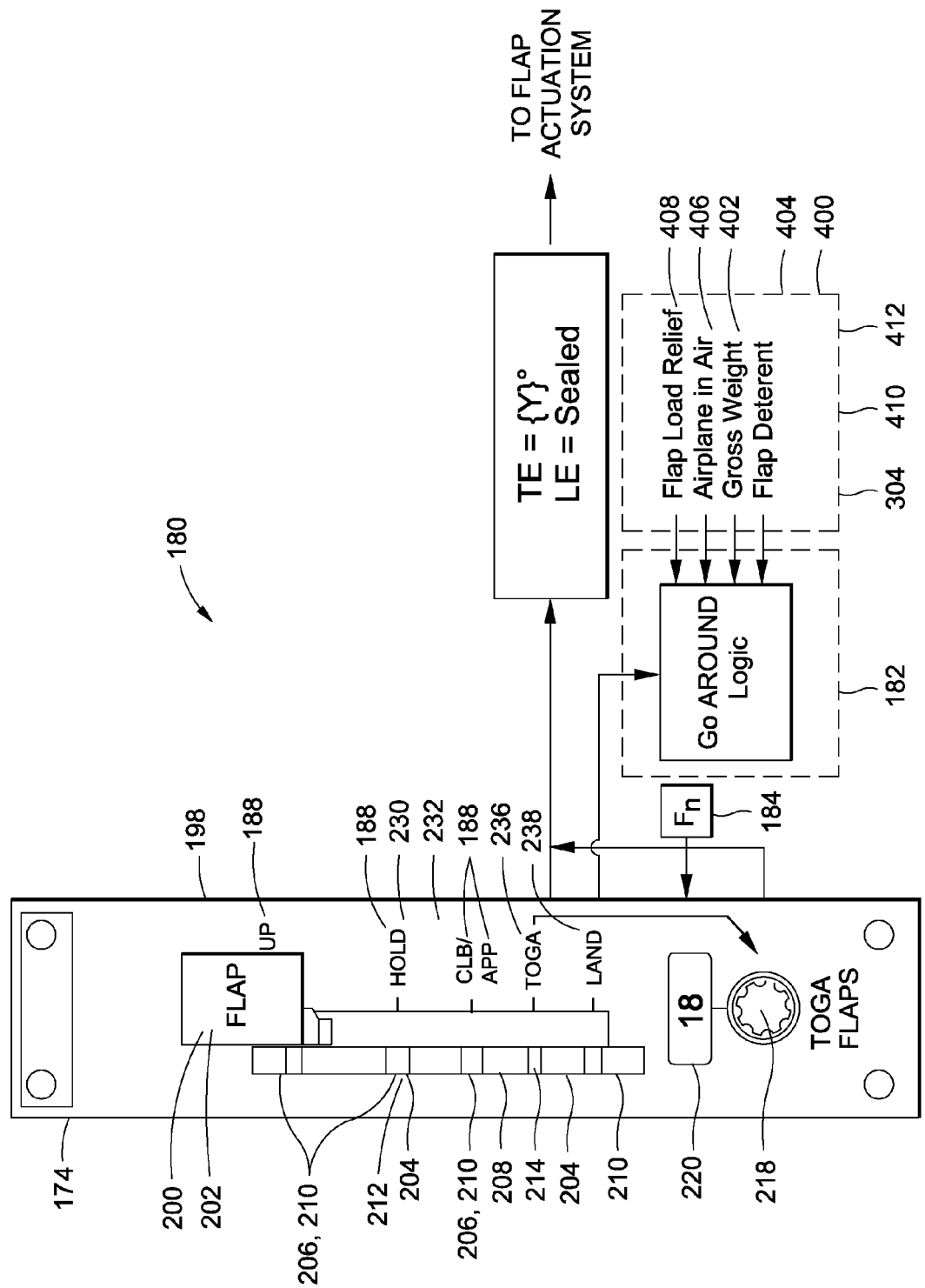
FIG. 8 is a diagrammatic view of a further embodiment of the flap control system including a switch for enabling movement of the flaps from the optimum flap setting to the adjusted flap setting.

Referring to FIG. 8, shown is an alternative embodiment of the flap control system 198 including a switch 218 allowing for manual adjustment of the flaps 158 from the optimum flap setting 184 into an adjusted flap setting 186 (FIG. 6) that is different than the optimum flap setting 184, as mentioned above. The switch 218 may allow the pilot or other flight crew member to manually fine tune the position of the flaps 158 at the initiation of the go-around operation 428. The switch 218 may also allow for manual adjustment of the flap setting as the go-around operation progresses. For example, upon moving the flap control lever 202 from the landing flaps position 238 (LAND—FIG. 7) to the go-around flaps position 236 (TOGA—FIG. 7), the pilot or other flight crew may visually observe the optimum flap setting 184 in the display window 220. Upon observing the value of the optimum flap setting 184 computed by the flap optimizing computer 182, the pilot may adjust the position of the flaps 158 using the switch 218 in consideration of certain information. For example, the pilot may change the flap setting from the optimum flap setting 184 to an adjusted flap setting 186 in consideration of obstacles or terrain that may be located in the area where the go-around operation 428 will be performed.

In FIG. 8, in an embodiment, the switch 218 may be located on the flap control device 200 such as below the display window 220. The switch 218 may be configured to change the flap 158 position in flap deflection increments 170 (FIG. 6) of no greater than approximately one degree of actual flap angle. For example, in an embodiment, the flap deflection increment 170 (FIG. 6) may be approximately 0.5 degree of actual flap angle 168. In a further embodiment, the flap deflection increment 170 (FIG. 6) may be approximately 0.3 degree of actual flap angle 168. The flap deflection increment 170 may be smaller than the flap angle between two adjacent standard flap positions on the flap control system 198. For example, the flap deflection increment 170 may allow for positioning the flaps 158 in actual flap angle 168 increments of one degree, which may be smaller that the difference in the actual flap angle 168 between the landing flaps position 238 (e.g., Flaps 30) and the standard go-around flaps position 236 (e.g., Flaps 20).

In FIG. 8, the switch 218 may be operative to change the optimum flap setting 184 to an adjusted flap setting 186 (FIG. 6) when the flap control lever 202 is in a landing flaps position 238. However, the switch 218 may be operative when the flap control device 200 is in the landing flaps position 238 and/or the go-around flaps position 236. In an embodiment, the switch 218 may be non-operative when the flap control device 200 is not in the go-around flaps position 236. The switch 218 may be configured as a rotary dial, a push-button mechanism, a mechanical slider, or in any other switch embodiment.

In FIG. 8, the switch 218 may include a plurality of switch positions (not shown) which may have mechanical stops provided by discrete contacts at each switch position. In an embodiment, each switch position may correspond to a flap deflection increment. For example, in the rotary switch embodiment shown in FIG. 8, the space between each detent or switch position of the switch 218 may correspond to an actual flap angle 168 of approximately one (1) degree of flap deflection. However, the space between each switch position may correspond to an actual flap angle 168 that may be larger or smaller than one (1) degree of flap deflection. The detents at each one of the switch positions may be configured to prevent inadvertent actuation or movement of the switch 218.

In FIG. 8, the flap control system 198 may be communicatively coupled to the leading edge device actuation system 132 (FIG. 3) of the aircraft 100. As indicated above, the aircraft 100 may include one or more leading edge devices 130 such as slats 134 (FIG. 1) and/or Krueger flaps 136 (FIG. 1) which may be operatively coupled to the leading edge device actuation system 132. In an embodiment, the flap optimizing system 180 may be configured such that the leading edge devices 130 automatically retract from a gapped position 144 (FIG. 4) to a sealed position 142 (FIGS. 5-6) when the flap control device 200 is moved from the landing flaps position 238 to the go-around flaps position 236. By retracting the leading edge slats 134 from a gapped position 144 to a sealed position 142 (FIG. 3), aerodynamic drag may be reduced which may improve the climb performance of the aircraft 100 during a go-around operation 428 (FIG. 2).

Methods for optimizing a flap setting of an aircraft 100, for example during a go-around operation, may include computing an optimum flap setting 184 for the flaps 158 of the aircraft, selecting a designated flap setting (e.g., a designated control device position 208) of a flap control system 198, and automatically commanding the flaps 158 to the optimum flap setting 184 in response to the selecting of the designated flap setting (e.g., the designated control device position 208). In some examples, the selecting of the designated flap setting (e.g., designated control device position 208) may include moving a flap control lever 202 from a first position (e.g., a LAND flap setting) to a second position corresponding to the designated control device position 208. The first position may correspond to a non-designated flap setting (e.g., a non-designated control device position 210), for example a LAND flap setting, while the second position may correspond to a TOGA flap setting. In some examples, the computing of the optimum flap setting 184 may be responsive to the selection of one of the non-designated control device positions 210. In some examples, the computing of the optimum flap setting 184 may be responsive to the selection of any of the non-designated flap settings (e.g., any one of the non-designated control device positions 210) and the computing of the optimum flap setting 184 may be performed continuously or at certain time intervals while the flap control system 198 remains in automatic command mode. In examples, the method may optionally include manually controlling the flaps 158 to an adjusted flap setting 186 other than the optimum flap setting 184 while the flap control system 198 remains in automatic command mode, for example, by manipulating a switch 218 in the flight deck.

Figure 9:
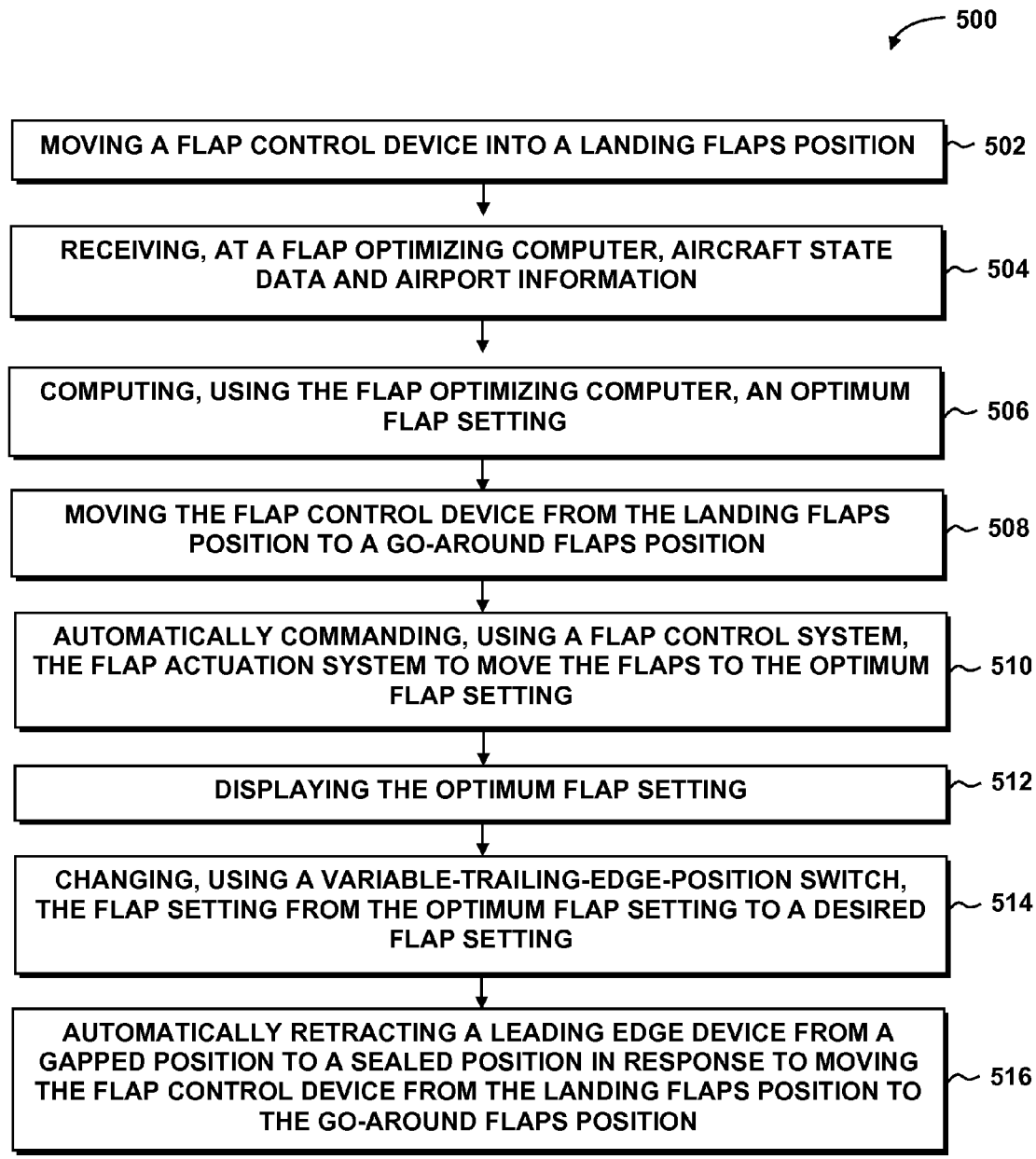
FIG. 9 is a flow chart including one or more operations that may be included in a method of optimizing a flap setting of an aircraft.

Referring to FIG. 9 with additional reference to the block diagram of FIG. 2 and the examples in FIGS. 7 and 8, shown is flow chart of an example of a method 500 of optimizing a flap setting of an aircraft 100. The method 500 may include manually moving a flap control device 200 into a landing flaps position 238 such as during final approach, as shown in step 502 of FIG. 9. A flap control lever 202 may be moved into the landing flaps position 238 from a shallower flap setting such as from the takeoff/go-around (TOGA) flaps position 236.

The method 500 may include receiving, e.g., at the flap optimizing computer 182, aircraft state data 400 and/or airport information 304, as shown in step 504 of FIG. 9. In an embodiment, the aircraft state data 400 and/or the airport information 304 may be provided to the flap optimizing computer 182 when the flap control lever 202 is in the landing flaps position 238. The aircraft state data 400 may include the aircraft gross weight 402, the aircraft center of gravity 404, and/or other information that may affect the climb performance of the aircraft 100. The airport information 304 may include atmospheric data 320 such as outside air temperature 322, barometric pressure, pressure altitude 326, density altitude 324, and/or other meteorological data. The airport information 304 may also include environmental information in the area of the missed approach including, but not limited to, obstacle data, terrain data, and other information that may affect the climb gradient of the aircraft 100.

As shown in step 506 of FIG. 9, the method 500 may include computing, e.g., using the flap optimizing computer 182, the optimum flap setting 184 when the flap control device 200 is in a non-designated control device position 210. For example, the optimum flap setting 184 may be computed by the flap optimizing computer 182 when the flap control lever 202 is in the landing flaps position 238. The aircraft state data 400 and/or airport information 304 may be provided to the flap optimizing computer 182 on a substantially continuous basis when the flap control device 200 is in the landing flaps position 238. In some examples, the method may include receiving updated aircraft state data 400, updated airport information 304, or combinations thereof, and re-computing the optimum flap setting 184 using the updated aircraft state data 400, the updated airport information 304, or combinations thereof while the flap control device 200 remains in the non-designated control device position 210. In some examples, the method may include moving the flap control device 200 to the non-designated control device position 210 prior to computing the optimum flap setting 184. The computing of the optimum flap setting 184 may be responsive to the moving of the flap control device 200 to the non-designated control device position 210.

As shown in step 508 of FIG. 9, the method 500 may include manually moving the flap control device 200 (e.g., flap control lever 202) from a non-designated control device position 210 to a designated control device position 208. For example, the flap control lever 202 may be moved from the landing flaps position 238 (e.g., LAND) to the go-around flaps position 236 (e.g., TOGA). The flap optimizing computer 182 may continue to calculate the optimum flap setting 184 after the flap control lever 202 is moved from the landing flaps position 238 to the go-around flaps position 236, and after the flaps 158 have moved to the optimum flap setting 184.

As shown in step 510 of FIG. 9, the method 500 may include automatically commanding, using the flap control system 198, the flap actuation system 172 to position the flaps 158 at the optimum flap setting 184 when the flap control device 200 (flap control lever 202) is moved from a non-designated control device position 208 (e.g., the landing flaps position 238) to a designated control device position 208 (e.g., the go-around flaps position 236). Movement of the flaps 158 to the optimum flap setting 184 may be performed before or after advancing the thrust levers to a go-around thrust 410 setting, and/or before or after retracting the landing gear 126 to place the aircraft 100 in a go-around configuration.

As shown in step 512 of FIG. 9, the method 500 may optionally include displaying the optimum flap setting 184 or an adjusted flap setting 186 in the display window 220 of the flap control system 198. The optimum flap setting 184 or the adjusted flap setting 186 may be displayed in the display window 220 when the flap control device 200 is in the landing flaps position 238. However, in an embodiment, the optimum flap setting 184 computed by the flap optimizing computer 182 may be continuously displayed on the display window 220 regardless of whether the flap control lever 202 is in the landing flaps position 238 or the go-around flaps position 236, or any other flaps position. In an embodiment, the optimum flap setting 184 may be displayed in the display window 220 until the flap control lever 202 is moved out of the go-around flaps position 236.

As shown in step 514 of FIG. 9, the method 500 may optionally include manually changing the flap setting of the flaps 158 from the optimum flap setting 184 to an adjusted flap setting 186. In this regard, the method may include manipulating a switch 218 to manually command the flaps 158 from a first position corresponding to the optimum flap setting 184 to an adjusted position that is different than the first position. In some examples, an adjusted flap setting 186, which may be different than the optimum flap setting 184, may be manually selected by operating a switch 218. As indicated above, when the flap control device 200 is in the landing flaps position 238, the pilot or flight crew may change the optimum flap setting 184 to an adjusted flap setting 186 that is different than the optimum flap setting 184. The pilot may then move the flap control lever 202 from the landing flaps position 238 to the go-around flaps position 236 to cause automatic actuation of the flaps 158 to the adjusted flap setting 186. The switch 218 may be used to change the flap setting in flap deflection increments 170 as described above. The switch 218 may also be operative to change the optimum flap setting 184 to an adjusted flap setting 186 when the flap control lever 202 is in the go-around flaps position 236.

As shown in step 516 of FIG. 9, the method 500 may optionally include automatically retracting one or more leading edge devices 130 when the flap control lever 202 is moved into the go-around flaps position 236. For example, moving the flap control lever 202 into the go-around flaps position 236 may cause automatic retraction of the leading edge slats 134 from a gapped position 144 (FIG. 4) to a sealed position 142 (FIGS. 5-6). As indicated above, the sealed position 142 of the leading edge slats 134 may reduce aerodynamic drag which may improve the climb performance of the aircraft 100 during a go-around operation. In addition, the method may include positioning the ailerons 152, flaperons 154, and other trailing edge devices 150 into the optimum flap setting 184 or an adjusted flap setting 186 when the flaps 158 are positioned in the optimum flap setting 184 or adjusted flap setting 186.

Figure 10:
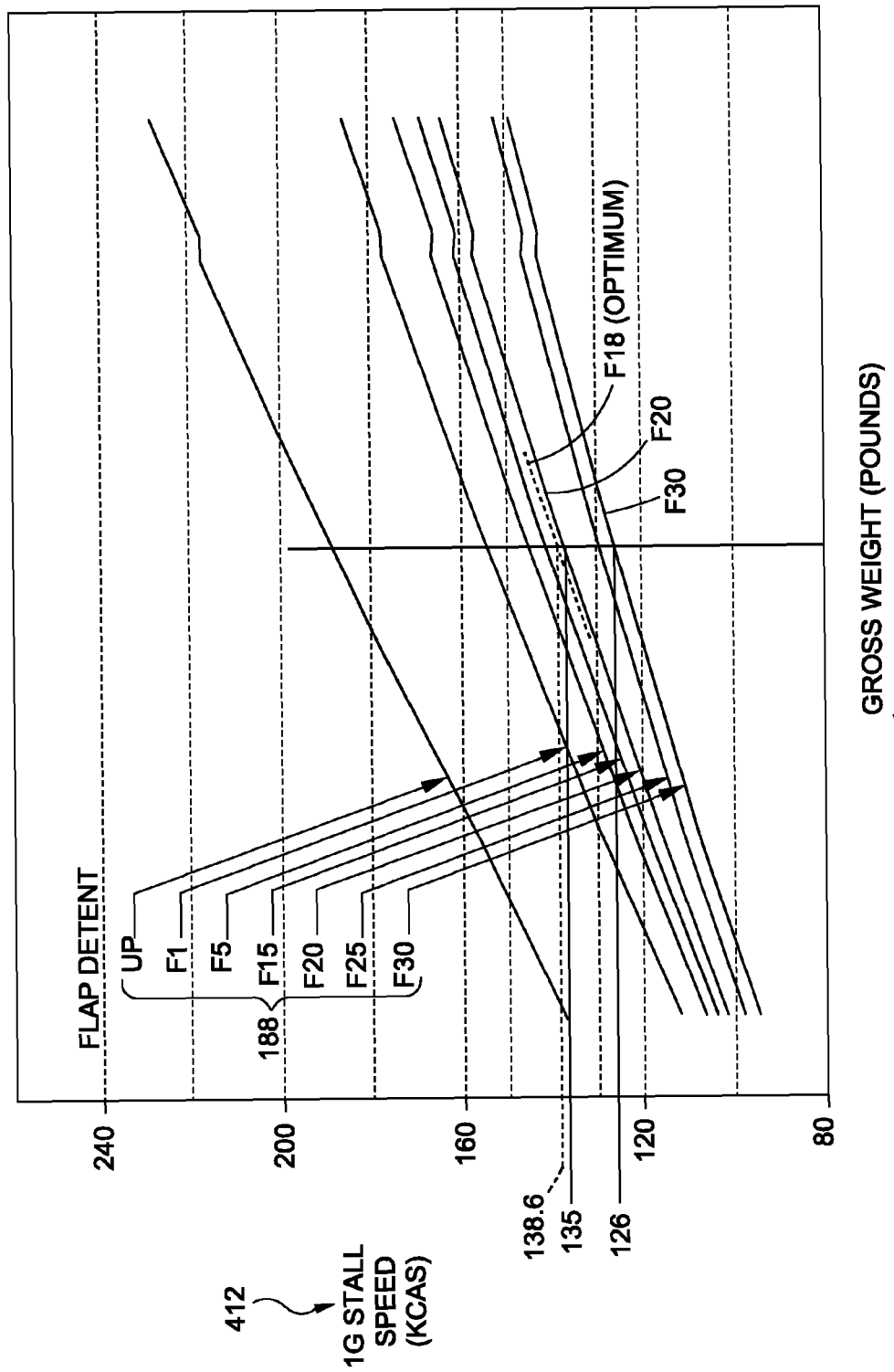
FIG. 10 is a graph plotting 1-g stall speed of an aircraft as a function of aircraft gross weight for a plurality of standard flap settings, and further illustrating an optimum flap setting for the aircraft allowing for a maximum stall speed for the aircraft.

In FIG. 10, shown is a graph plotting the 1-g reference stall speed of an aircraft 100 as a function of aircraft gross weight 402 for a plurality of standard flap settings 188. As indicated above, FAR 25.121(d) specifies that the stall speed of an aircraft in the approach configuration must not exceed 110 percent of the stall speed ("the 110% speed rule") for a related all-engines-operating landing configuration. In FIG. 11, for the reference gross weight indicated on the graph, the reference stall speed for the aircraft at a landing flaps setting of Flaps 30 is 126 knots. For the same reference gross weight, the reference stall speed at a standard approach flaps setting of Flaps 20 is 135 knots, which is less than 110 percent of the stall speed of the aircraft at the landing flaps setting. In this regard, the optimum flap setting 184 for the aircraft may be at the upper end of the 110 percent range between the landing stall speed and approach stall speed. For example, an optimum flap setting 184 of F18 may provide the aircraft with an approach stall speed of 138.6 knots (i.e., 1.1×126 knots) which would allow for an increase in the maximum takeoff weight of the aircraft, and still meet the above-mentioned approach-climb and landing-climb gradient requirements under FAR 25.121(d) and 25.119.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A system for optimizing a flap setting of an aircraft, comprising:
   a flap optimizing computer configured to compute an optimum flap setting during flight for one or more flaps of an aircraft;
   a flap control system communicatively coupled to the flap optimizing computer, the flap control system including a flap control device movable to any one of a plurality of control device positions including a designated control device position for selecting any one of a plurality of corresponding standard flap settings including a designated flap setting;
   a flap actuation system communicatively coupled to the flap control system and configured to actuate the one or more flaps;
   wherein the flap control system is configured to automatically command the flap actuation system to move the one or more flaps to the optimum flap setting in response to the manual movement of the flap control device to the designated control device position during flight; and
   the optimum flap setting being different than the standard flap settings.

2. The system of claim 1, wherein:
   the flap optimizing computer is configured to compute the optimum flap setting based, at least in part, on aircraft state data, airport information, or combinations thereof;
   the aircraft state data includes aircraft gross weight, aircraft center of gravity, aircraft-in-air indication, flaps load relief capability, or combinations thereof; and
   the airport information includes outside air temperature, pressure altitude, density altitude, or combinations thereof.

3. The system of claim 1, wherein:
   the flap optimizing computer is configured to re-compute the optimum flap setting based on aircraft state data, airport information, or combinations thereof, which is continuously updated when the flap control device is in the designated control device position.

4. The system of claim 1, further comprising:
a switch configured to allow manual control of the one or more flaps from the second position to an adjusted position different than the second position while the flap control device remains in the designated control device position.

5. The system of claim 4, further comprising:
a display window configured to display the optimum flap setting, an adjusted flap setting corresponding to the adjusted position, and/or an actual flap deflection angle.

6. The system of claim 1, wherein:
the control device positions include a landing flaps position and a go-around flaps position, the go-around flaps position comprising the designated control device position;
the flap optimizing computer configured to compute the optimum flap setting while the flap control device is in the landing flaps position; and
the flap control system configured to automatically command the flap actuation system to position the flaps at the optimum flap setting in response to movement of the flap control device from the landing flaps position to the go-around flaps position.

7. The system of claim 6, wherein:
the flap control system is communicatively coupled to a leading edge device actuation system operatively coupled to one or more leading edge devices; and
the flap control system configured to automatically command the leading edge device actuation system to retract a leading edge device from a gapped position to a sealed position responsive to the selection of the designated control device position.

8. The system of claim 6, wherein:
the flap control device comprises a flap control lever movable to a plurality of flap lever positions including the landing flaps position and the go-around flaps position.

9. The system of claim 1, wherein:
the flap optimizing computer is integrated with a flight control computer onboard the aircraft.

10. An aircraft, comprising:
a wing;
at least one flap mounted to the wing;
a flap optimizing system for optimizing a flap setting, including:
  a flap optimizing computer configured to compute an optimum flap setting during flight for the at least one flap;
  a flap control system communicatively coupled to the flap optimizing computer and including a flap control device movable to any one of a plurality of control device positions including at least one designated control device position for selecting any one of a plurality of corresponding standard flap settings including a designated flap setting;
  a flap actuation system communicatively coupled to the flap control system and configured to position one or more flaps;
the flap control system configured to automatically command the flap actuation system to position the at least one flap at the optimum flap setting when the flap control device is manually moved into the designated control device position during flight; and
the optimum flap setting being different than the standard flap settings.

11. A method of optimizing a flap setting of an aircraft, comprising:
computing an optimum flap setting for a flap of an aircraft based, in part, on aircraft state data, airport information, or combinations thereof;
manually moving, during flight, a flap control device from a non-designated control device position to a designated control device position for selecting any one of a plurality of corresponding standard flap settings including a designated flap setting;
automatically commanding a flap actuation system to position the flap at the optimum flap setting in response to moving the flap control device from the non-designated control device position to the designated control device position; and
the optimum flap setting being different than the standard flap settings.

12. The method of claim 11, wherein:
the aircraft state data includes aircraft gross weight, aircraft center of gravity, aircraft-in-air indication, flaps load relief capability, or combinations thereof; and
the airport information includes outside air temperature, pressure altitude, density altitude, or combinations thereof.

13. The method of claim 11, further comprising:
receiving updated aircraft state data, updated airport information, or combinations thereof; and
re-computing the optimum flap setting using the updated aircraft state data, the updated airport information, or combinations thereof while the flap control device remains in the non-designated control device position.

14. The method of claim 11, further comprising:
moving the flap control device to the non-designated control device position prior to computing the optimum setting; and
wherein computing the optimum setting is responsive to the moving of the flap control device to the non-designated control device position.

15. The method of claim 11, further comprising:
manipulating a switch to manually command the flap from a first position corresponding to the optimum flap setting to an adjusted position that is different than the first position.

16. The method of claim 15, further comprising:
displaying at least one of the following on a display window: the optimum flap setting, an adjusted flap setting corresponding to the adjusted position.

17. The method of claim 11, wherein the steps of computing the optimum flap setting, moving the flap control device, and commanding the flaps comprise:
computing the optimum flap setting when the flap control device is in the landing flaps position;
manually moving the flap control device from a landing flaps position to a go-around flaps position; and
automatically commanding the flap actuation system to position the flap at the optimum flap setting when the flap control device is moved from the landing flaps position to the go-around flaps position.

18. The method of claim 17, wherein the step of computing the optimum flap setting when the flap control device is in the landing flaps position comprises:
moving the flap control device to the landing flaps position;
receiving the aircraft state data and/or the airport information in response to moving the flap control device to the landing flaps position; and
determining the optimum flap setting in response to receiving the aircraft state data and/or the airport information.

19. The method of claim 17, further comprising:
automatically retracting one or more leading edge devices from a gapped position to a sealed position in response to moving the flap control device from the landing flaps position to the go-around flaps position.

* * * * *